United States Patent [19]

Wolf et al.

[11] Patent Number: 4,548,707
[45] Date of Patent: Oct. 22, 1985

[54] USE OF HIGH ETHOXYLATE LOW CARBON ATOM AMINES FOR SIMULTANEOUS REMOVAL OF SULFONATE SURFACTANTS AND WATER FROM RECOVERED CRUDE OIL

[75] Inventors: Nicholas O. Wolf; Kang Yang, both of Ponca City, Okla.

[73] Assignee: Conoco Inc., Ponca City, Okla.

[21] Appl. No.: 602,856

[22] Filed: Apr. 23, 1984

[51] Int. Cl.$^4$ .................. B01D 17/04; C10G 33/04
[52] U.S. Cl. .................. 208/188; 166/267; 210/708; 252/344; 252/358
[58] Field of Search .......... 208/188; 210/708, 735; 252/338, 357, 344, 358; 166/267

[56] References Cited

U.S. PATENT DOCUMENTS

| | | | |
|---|---|---|---|
| 4,089,803 | 5/1978 | Bessler | 252/358 |
| 4,209,422 | 6/1980 | Zimmerman et al. | 252/358 |
| 4,261,812 | 4/1981 | Newcombe | 210/708 |
| 4,374,734 | 2/1983 | Newcombe | 210/708 |
| 4,416,796 | 11/1983 | Bohm et al. | 252/338 |
| 4,444,654 | 4/1984 | Cargle et al. | 210/708 |

*Primary Examiner*—Peter Hruskoci
*Attorney, Agent, or Firm*—Cortlan R. Schupbach, Jr.

[57] ABSTRACT

This invention relates to secondary or tertiary recovery processes for the recovery of oil from subterranean oil-bearing reservoirs. More particularly, this invention relates to an improved method for the recovery of petroleum from underground reservoirs, which petroleum contains sulfonate surfactants and water and for a method of removing said sulfonate surfactants and water from petroleum produced from said recovery processes.

5 Claims, 1 Drawing Figure

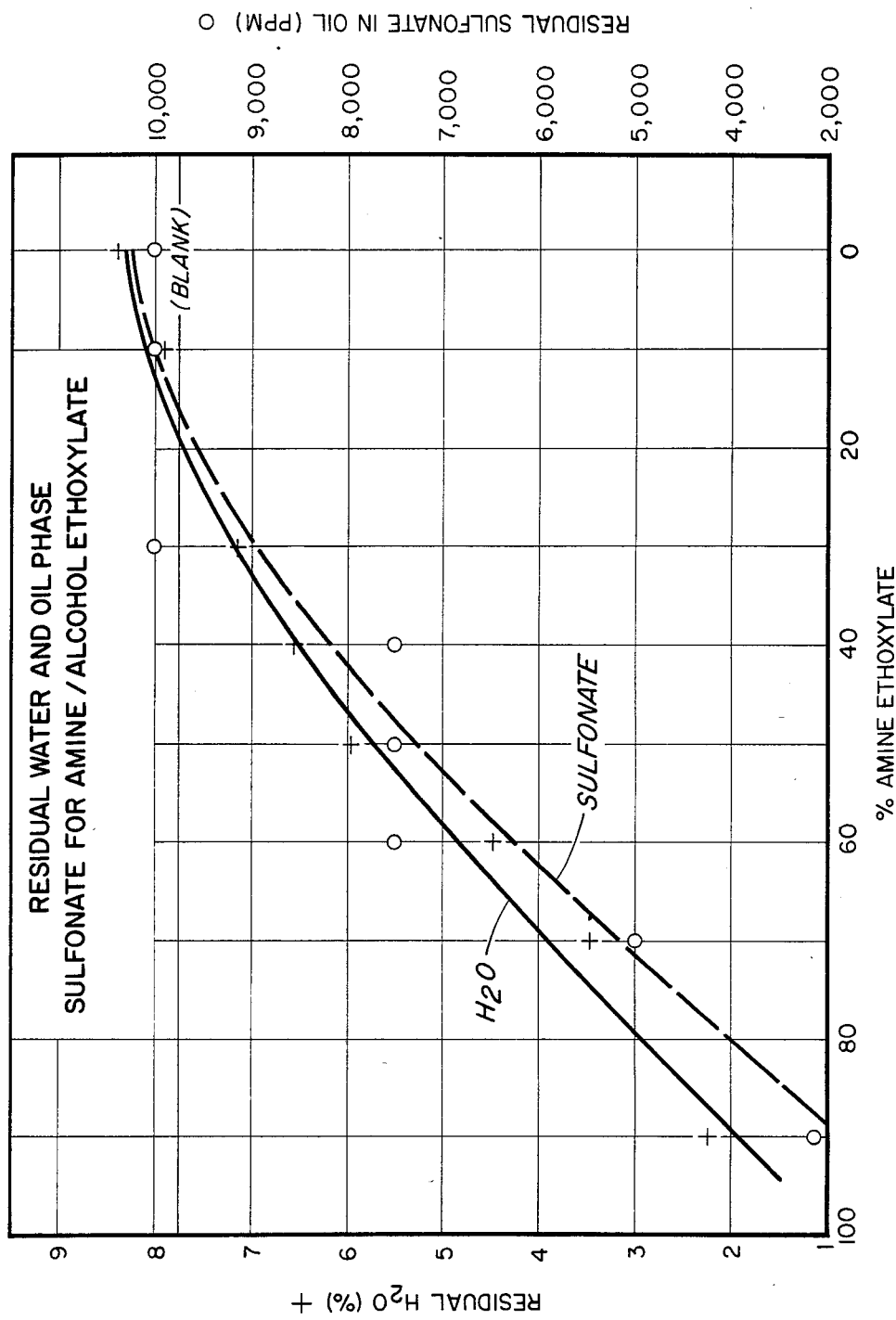

USE OF HIGH ETHOXYLATE LOW CARBON ATOM AMINES FOR SIMULTANEOUS REMOVAL OF SULFONATE SURFACTANTS AND WATER FROM RECOVERED CRUDE OIL

This invention relates to a method for separation of sulfonate surfactants and water from recovered crude oil. More particularly, this invention relates to a separation technique wherein sulfonate surfactants and water are simultaneously removed from crude oil using low carbon atom amines ethoxylated to high levels.

Primary oil production from subterreanean oil bearing reservoirs is normally obtained by exploiting the natural energy of the reservoir in the form of water drive, gas cap drive, solution gas drive, and combinations of these methods. Oil remaining in the reservoir after primary energy sources have been depleted can be partially recovered by secondary recovery methods. One of the most common secondary recovery methods is waterflooding. Using this method, flooding water is injected into the reservoir through one or more injection wells traversing the oil bearing reservoir. The water displaces the oil in the reservoir and moves it through the reservoir toward one or more production wells from which oil is produced. However, this may recover only 30 to 50% of the remaining oil in place, thus leaving considerable quantities of oil remaining in the reservoir.

Tertiary oil recovery is normally used, following waterflooding, one method of which is the use of surface active agents to "scrub" the oil from the rocks or sands in which the oil is found, permitting displacement of the oil to a producing well. Surfactants which are added are commonly petroleum sulfonates or derivatives thereof. These surfactants have a built-in defect in that such surface active agents, while efficient in removing petroleum from a reservoir, are frequently exceedingly difficult to remove from the petroleum once it has been produced. In addition, these produced petroleums also contain quantities of water which have been injected into the reservoir as an aqueous surfactant solution containing both the sulfonate and water.

In many enhanced recovery processes, significant amounts of water are produced along with oil in the form of emulsion, especially since water is injected with the sulfonate surfactants in many cases. The breaking of these emulsions produced in such tertiary recoverying operations is difficult because the surfactant (and particularly sulfonate surfactants) stabilize the emulsions. In addition, the sulfonate surfactants used in tertiary recovery processes are relatively expensive and add greatly to such recovery costs. These surfactants tend to stay in the oil phase and cause problems in downstream processing units. To the extent that such surfactants do not remain in the crude, they become pollutants. The disposal of aqueous streams containing the surface active agents in streams and other bodies of water causes pollution. All these factors have greatly slowed the development of tertiary sulfonate surfactant recovery processes in most countries.

A large body of art exists on the use of sulfonate surfactants in tertiary petroleum recovery operations. The problem of breaking oil in water emulsions and removing sulfonates from the recovered petroleum is a problem which is well known. Representative but non-exhaustive of art in the area are a number of United States Patents. U.S. Pat. No. 4,029,570 contacts an emulsion with an formation brine to produce a sprung oil phase and a water phase and is most effective for oil and water emulsions characterized by high surfactant content. However, this reference does not deal with surfactant recovery. U.S. Pat. No. 4,216,079 provides a process for recovering crude oil, water and surfactants from oil and water emulsions by adding sufficient brine together with a partitioning agent to form an oil phase with a minor amount of surface active agents, a partitioning agent phase containing surface active agents and a brine phase containing a minor amount of surface active agents.

U.S. Pat. No. 4,014,801 breaks polymer-containing emulsions by treating them with a divalent cation such as calcium chloride in the strong oxidizing or reducing agent. U.S. Pat. No. 4,029,570 discloses breaking emulsions of crude oil in water by addition of a naturally occuring reservoir brine containing chlorine anions and various alkali and alkaline earth cations.

However, even after breaking emulsions, a large amount of surfactant and water remains entrained in the recovered crude oil. U.S. Pat. No. 4,089,803 relates to the deemulsification of surfactant-petroleum waterflood emulsions using a composition comprising conventional hydrocarbon deemulsifiers in conjunction with amines. The deemulsifiers employed are oxyalkylated phenol aldehyde resins wherein the amine is a polyamine containing diethylenetriamine and the like. U.S. Pat. No. 3,975,295 utilizes a surface active composition containing a substantial amount of solid cation amine, preferably diamine, and an alkylene oxide condensate to produce an acid salt employed in deemulsification. U.S. Pat. No. 3,696,057 discloses an anti-foaming composition obtained from the mixture of components of a reaction product of an amine and alkylene oxide with the reaction product of a fatty alcohol and alkylene oxide having specific weight proportions.

However, all these references have in common the fact that only incomplete sulfonate removal or water removal is obtained. It would therefore be of great benefit to provide a method for the simultaneous and substantially complete removal of both water and sulfonate from recovered petroleum in a single step.

It is therefore an object of the present invention to provide a method for the simultaneous removal of water and sulfonate surfactants from recovered petroleum. Other objects will become apparent to those skilled in this art as the description proceeds.

We have now discovered that the use of mono-amine di-amines, tri-amines and mixtures of these which are ethoxylated to levels of from about 40 to about 95% and which contain no more than 7 carbon atoms in any hydrocarbon group attached to an amine (hereinafter referred to as amine ethoxylates) provide a superior deemulsifying agent which is used to remove both water and sulfonates simultaneously from crude oil, especially when produced by surfactant flooding. Use of this material eliminates water in recovered crude which increases pipeline transportation costs, as well as sulfonates which cause problems in downstream refining operations.

Thus the present invention provides for the simultaneous removal of sulfonates and water from emulsion with crude oil comprising contacting the water/sulfonate/crude oil emulsion with mono-amines, di-amines, tri-amines or mixtures of these containing 7 or less carbon atoms in each hydrocarbon unit per amine group, which amines have been ethoxylated to a level of from 40 to 95% ethylene oxide by weight to form an ethoxylate and allowing separation to occur.

Amines useful in the present invention are water-soluble amines having a general formula selected from the group consisting of

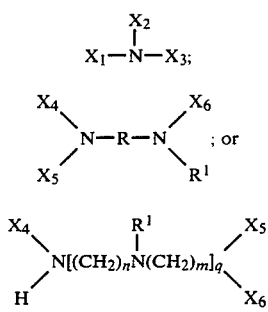

(1)

(2)

(3)

wherein $X_1$, $X_2$, and $X_3$ are, independently, hydrogen, $CH_2CH_2OH$, $CH_2CH(CH_3)OH$, and wherein $X_4$, $X_5$, $X_6$, R and $R^1$ are independently, straight branched cyclic or aromatic hydrocarbon groups containing no more than 7 carbon atoms $X_4$, $X_5$, $X_6$ and $R^1$ can be hydrogen, and wherein n and m are less than or equal to 7, and q is less than or equal to 20.

Representative but non-exhaustive examples of amines represented by general formula (1) are triethanol amine, diethanolamine, ethanolamine, methylamine, ethylamine, pentylamine, dimethylamine, methylpentylamine and methylhexyl amine.

Representative but non-exhaustive examples amines represented by general formula (2) are ethylenediamine, hexamethylene diamine, and 1,2-diaminocyclohexane.

Representative but non-exhaustive examples of amines represented in formula (3) are bishexamethylene triamine and spermene.

When forming the surfactants of the present invention, ethoxylation is carried out at temperatures ranging from about 90° C. to about 260° C. However, more normal temperatures are from about 100° C. to about 260° C. Commercial operations are normally carried out at a temperature range of from about 150° C. to about 250° C. The most preferred temperatures are from 150° C. to about 190° C.

Amine ethoxylates are prepared using catalysts well known to those skilled in the art such as sodium hydroxide and potassium hydroxide.

When utilizing the amines described in the process of the present invention, the amine ethoxylates are used in a concentration of from about $1 \times 10^{-5}$ percent by weight to about 10% by weight based on the total emulsion weight. However, it is preferred that the amines of the present invention be used at a level of from about 1% by weight to about $1 \times 10^{-3}$ percent by weight.

When utilizing the amine ethoxylates of the present invention to remove sulfonates and water from the recovered petroleum, any convenient temperature can be used. Normally, these materials are used at a temperature of from about 10° C. to about 250° C., although temperatures of from about 20° C. to about 95° C. are preferred, and the process will most preferably be carried out around 40° C.

In carrying out the instant invention, well known techniques are used in that the amine ethoxylates are contacted with the crude oil containing sulfonate and water in an intimate fashion, such as by agitation, stirring or shaking, whereafter the total mixture is allowed to stand until phases have separated. After separation, two phases will be apparent, an upper oil phase and a lower water phase. Separation of these phases by well known techniques such as separation vessels or decanting is effective in removing substantially all surfactants (the amines of the present invention as well as sulfonates) and water from the recovered petroleum.

The ethoxylated amine emulsion breaking chemicals are effective of removing both water and sulfonate surfactant from produced crude when used according to standard techniques. Their effectiveness can be increased, however, if applied in conjunction with a fresh water wash. This fresh water wash used clean, low salinity, warm water to help extract the sulfonates from the emulsion.

Initially, free water and most water-soluble sulfonates are removed from production oil in a free water knockout. The amine treating chemical is mixed with the remaining emulsion after the knock out. Immediately thereafter about 20% warm (160°–180° F.) fresh water is added and gently mixed with the oil and water via a static mixer. The oil/water/surfactant mixture is allowed to separate. Heat can be applied at any stage of the process to facilitate treating, but usually temperatures of the emulsion are maintained in the 100° F. to 150° F. range.

The order of processing is not critical. Once the free water is removed, the water and ethoxylated amine can be applied in any order. Treating chemical rates and fresh water rates should be adjusted to suit immediate needs, but the chemical will be used in the range of 100 to 5,000 ppm of emulsion and the water in the range of 10–40% of emulsion.

The invention is more concretely described with reference to the examples below wherein all parts and percentages are by weight unless otherwise specified. The examples are provided to illustrate the present invention and not to limit it.

BRIEF DESCRIPTION OF THE DRAWING

The FIGURE shows the results produced in Example 1.

EXAMPLE 1

A mixed ethoxylate was made from 12–14 ALFOL alcohol (a 12–14 carbon atom alcohol, trademark of and sold by Conoco Inc.) and bis-hexamethylene triamine. The mixture of alcohol and amine was co-ethoxylated to a level of 60% to produce the various blends used. The alcohol and amines were mixed at various ratios and ethoxylated. Each ratio was separately tested on an emulsion prepared from a paraffinic crude oil obtained from Big Muddy Wall Creek, Big Muddy Field, Wyo., 0.6% NaCl brine in a mixture of sodium sulfonate surfactants having the molecular average weight of 405 gram equivalents. The emulsions tested were oil external containing about 40% brine and 1% active sulfonate.

The recovered paraffinic crude oil and the ethoxylate mixture was agitated and allowed to stand for about 20 hours at 60° C. in a constant bath. The recovered oil layer was checked for water and sulfonate content and the water layer was checked for sulfonate content. The results are set forth the FIGURE, and examination of the FIGURE clearly discloses that as the level of alcohol ethoxylates declined (and the level of amine ethoxylate conversely increased) that a surprising decrease in the amount of water and residual sulfonate in oil occurs. This is distinctly surprising since the art in general teaches that materials having carbon atoms in the known surfactant range i.e. from about 10 to about 22 carbon atoms, have been taught to be the most efficient in such removal. However, it has now been discovered that it is necessary that the amines be water soluble and contain 7 or less carbon atoms in any hydrocarbon group attached to the amine in order to simultaneously remove sulfonates and water from recovered crude oil. The amine utilized in the instant example (bishexamethylene triamine) does not contain any hydrophobic group and the ethoxylated product would not be expected to function as a surfactant. However, it was quite unexpectedly found that the ethoxylated bis-hexamethlene triamine functioned as a superb de-emulsifying and dewatering agent.

EXAMPLE 2

A crude oil emulsion was formed from 50.0 grams Bid Muddy Crude Oil, 50.0 grams water as 0.6 NaCl solution and 1.7 g "B" sulfonate (Trademark of and sold by Witco Chemical Co.). Samples were weighed into five ounce bottles and placed on a shaker for 30 minutes at 425 revolutions per minute (RPM).

The sample portion was treated with 1000 parts per million (ppm, where 0.1 milliliter (ml)=1000 ppm) ethoxylated amine, and shaken by hand for 1000 strokes. Thereafter, both samples and control were treated identically, and will be referred to as a unified procedure. All bottles were placed in a constant temperature bath at 60° C. for 20 hours for phase separation, then removed from the bath. The water layer was removed using a syringe.

The oil and water layers from all bottles were analyzed for sulfonate, and the oil layer water content was also determined. The amount of water in the oil layer was determined by the Karl-Fisher titration method, while the sulfonate was identified by thin layer chromatography. Amount of sulfonate in water was determined by methylene blue titration (ASTM D-1681-74). The results are set forth in Table 1.

TABLE 1

| Sample # | Amine | % EO | Oil Layer Water % | $SO_3$ ppm × $10^{-3}$ |
|---|---|---|---|---|
| 1 | BHMT | 40 | 4.72 | 8.75 |
| 2 | " | 50 | 2.35 | 3.75 |
| 3 | " | 60 | 2.59 | 3.12 |
| 4 | " | 70 | 2.41 | 3.12 |
| 5 | " | 80 | 2.00 | 3.12 |
| 6 | CONTROL* | — | 9.22 | 11.25 |
| 7 | BHMT | 40 | 3.82 | 7.50 |
| 8 | " | 50 | 2.27 | 3.75 |
| 9 | " | 60 | 1.80 | 2.50 |
| 10 | " | 70 | 2.57 | 1.87 |
| 11 | " | 80 | 2.93 | 1.87 |
| 12 | CONTROL* | — | 9.28 | 11.25 |

*0.1 ml VISCO 2VC-432 added to control

EXAMPLE 3

In lab experiments the crude to be produced by surfactant flooding is simulated by forming emulsions of Big Muddy Crude and water (1:1 water to crude) with 1.7% of a tertiary oil recovery surfactant commercially sold as "B" sulfonates from Witco. The procedures utilized are the same as those described in Example 2. After deemulsification with 1,000 parts per million volume (ppm) of additives, residual water and sulfonates in the oil layer were analyzed. The tests were repeated with ethoxylated bis-hexamethylene triamine which had been ethoxylated at various contents of ethylene oxide. In addition, a second commercial deemulsifier (Nalco Visco 2VC-432, a proprietary surfactant sold for this purpose) was tested in the same experiment. Surprisingly, the material sold for commercial use actually appeared to retain water in the oil phase without significant decrease of sulfonate, as opposed to the control. In contrast, the ethoxylated, low carbon amines utilized in the instant tests dramatically reduced both water and sulfonate content. The results are set forth in Table 2 below.

TABLE 2

| % EO | $H_2O$ % | Sulfonate (ppm × $10^{-3}$) |
|---|---|---|
| Control | 8.8 | 11.3 |
| 10 | 2.9 | 11.0 |
| 20 | 3.1 | 9.4 |
| 40 | 3.6 | 6.3 |
| 70 | 2.3 | 3.2 |
| 80 | 2.7 | 3.8 |
| Nalco Visco | 9.3 | 11.3 |

The amines and sulfonate materials of the separated phase can be recovered and reused once separated from each other and from the aqueous phase. Such separations are carried out using ordinary techniques well known to those skilled in this art, such as pH adjustment, alcohol extraction and the like. These recovered materials can be used alone or together with freshly prepared materials in further oil recovery and sulfonate extraction from crude oils. Such reuse provides significant decreases in material requirements.

All tests results were based on standard application techniques for emulsion treating chemicals. No unusual techniques are required to obtain the enhanced effects of the present invention.

While certain embodiments and details have been shown for the purpose of illustrating this invention, it will be apparent to those skilled in this art that various changes and modifications may be made herein without departing from the spirit or scope of the invention.

We claim:

1. A method for the simultaneous removal of sulfonate and water from emulsion with oil containing sulfonate and water comprising intimately contacting said emulsion with monoamines, diamines, triamines or mixtures of these, wherein the amines are water soluble amines having at least one general formula selected from the group consisting of

(1)

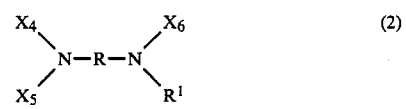

(2)

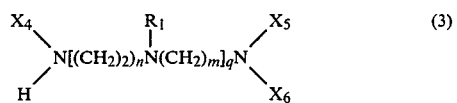

(3)

wherein $X_1$, $X_2$, and $X_3$ are, independently, hydrogen, hydrocarbon groups containing no more than 7 carbon atoms, $CH_2CH_2OH$, $CH_2CH(CH_3)OH$, and wherein $X_4$, $X_5$, $X_6$, and $R^1$ are, independently, hydrogen, straight, branched, cyclic or aromatic hydrocarbon groups containing no more than 7 carbon atoms, R is a straight, branched, cyclic, or aromatic hydrocarbon group containing no more than 7 carbon atoms, and wherein n and m are less than or equal to 7, and q is less than or equal to 20, which amines have been ethoxylated to a level of from about 40 to about 95% ethylene oxide by weight to form an ethoxylate, wherein such amine ethoxylates are present at a concentration from about $1 \times 10^{-5}$ weight percent to about 10 weight percent, based on total emulsion weight, allowing the emulsion to separate into a sulfonate/water/ethoxylated amine phase and an oil phase, and recovering the oil phase.

2. A method as described in claim 1 wherein the amine is selected from the group consisting of triethanolamine, diethanolamine, ethanolamine, methylamine, ethylamine, pentylamine, dimethylamine, methylpentylamine, methylhexylamine, ethylenediamine, hexamethylene diamine, 1,2-diaminocyclohexane, bis-hexamethylenetriamine, and spermene, or mixtures of these.

3. A method as described in claim 1 wherein the amine ethoxylates are used at a temperature of from about 10° C. to about 250° C.

4. A method as described in claim 1 wherein the sulfonate-containing oil is washed with fresh water and excess water separated from the oil prior to contacting with amine ethoxylates.

5. A method as described in claim 4 wherein the amine ethoxylates and sulfonates are separated and recovered.

* * * * *